Patented Mar. 15, 1927.

1,621,311

UNITED STATES PATENT OFFICE.

GEORGES CLAUDE, OF PARIS, FRANCE, ASSIGNOR TO SOCIETE L'AIR LIQUIDE (SOCIETE ANONYME POUR L'ETUDE ET L'EXPLOITATION DES PROCEDES GEORGES CLAUDE), OF PARIS, FRANCE.

MANUFACTURE OF FERTILIZERS.

No Drawing. Application filed December 20, 1923, Serial No. 681,321, and in France January 24, 1923.
Renewed August 5, 1926.

This invention relates to fertilizers and has special reference to a fertilizer containing combined nitrogen and potassium and composed substantially of potassium chloride and ammonium chloride.

According to this invention a process for the manufacture of a fertilizer consists in employing sylvinite (a crude salt consisting essentially of potassium chloride and sodium chloride and containing small quantities of magnesium salts, calcium salts and other potassium salts) or a similar mineral under appropriate conditions in place of the sodium chloride which is employed in the well known reaction of ammonium bicarbonate and sodium chloride in the presence of water (which reaction yields sodium bicarbonate and ammonium chloride), whereby a product is obtained containing both nitrogen and potassium which is of considerable importance as a fertilizer. By means of this substitution the sodium chloride contained in the sylvinite, and which is useless if not prejudicial in the use of the sylvinite as a fertilizer, is converted into ammonium chloride which joins the potassium chloride already contained in the sylvinite. There is thus obtained a fertilizer containing ammonium chloride and potassium chloride and in which both nitrogen and potassium in the combined condition are present. This substance, contrary to sylvinite is but very little deliquescent and is particularly advantageous for use for agricultural purposes.

The above process for the production of the ammonium chloride-potassium chloride product from sylvinite can in its practical application be carried out according to a variety of methods, such as those which are already known (for example the Schreib as described in German Patent No. 36,093 and other processes) for the precipitation of the sodium bicarbonate and the ammonium chloride from the same solution. The sylvinite may be utilized either in the solid state or in the form of a solution, and in all cases it is found that the potassium chloride does not interfere with the operations and crystallizes at the same time as the ammonium chloride, whilst the sodium chloride is practically wholly converted into bicarbonate of soda.

To obtain the desired product in accordance with the present invention, whilst operating for instance according to British Patent No. 131,870, there is taken the liquor from which the bicarbonate of soda has been separated as will be seen below.

This liquor is passed into a vat with a stirrer and a cooling coil. Whilst the stirring is going on, there are added per cubic metre of the above liquor 170 kilograms of sylvinite commercially termed 20–22 per cent and having the following composition:

| | |
|---|---|
| $H_2O$ | 0.5 |
| Insoluble matters | 9.4 |
| Potassium chloride | 31.5 |
| Sodium chloride | 58.6 |

There are also added per cubic metre of the original liquor:

| | Kilograms. |
|---|---|
| $NH_3$ | 62 |
| $CO_2$ | 62 |

The contents of the vat are cooled to 5° centigrade. The ammonium chloride precipitates with the chloride of potassium; the stirrer is stopped; the solid product is centrifuged and dried.

The mother liquors resulting from the treatment have the same volume as the original liquor and are passed into a carbonating apparatus in which they are diluted with 150 litres of water per cubic meter of the original liquor. Carbon dioxide is passed into it in order to precipitate the bicarbonate of soda. The latter is separated, washed and filtered and the remaining mother liquor is the one which has been taken at the beginning of the operation and is again treated as above.

In this manner, from each 100 kgs. of sylvinite there are produced 166 kgs. of the above product utilizable as fertilizer and consisting mainly of ammonium and potassium chlorides; its approximate percentage composition is:

| | |
|---|---|
| Water | 1.7 |
| Insoluble matters | 6.8 |
| Potassium chloride | 32.1 |
| Ammonium chloride | 58 |
| Sodium chloride | 1.4 | that is to say, a fertilizer containing simultaneously 15.2 per cent nitrogen and 20.2 per cent of $K_2O$ and a small amount of sodium chloride which is known to have a favorable effect on the growing of plants in such proportion.

Claims:—

1. A process for the manufacture of a fertilizer which comprises treating a mineral containing both potassium chloride and sodium chloride with carbon dioxide, ammonia and water to form sodium bicarbonate and ammonium chloride.

2. A process for the manufacture of a fertilizer which comprises treating sylvinite with carbon dioxide, ammonia and water to form sodium bicarbonate and ammonium chloride.

3. A process for the manufacture of a fertilizer which comprises treating a mineral containing both potassium chloride and sodium chloride with carbon dioxide, ammonia and water to form bicarbonate of soda and ammonium chloride and separately precipitating sodium bicarbonate and ammonium chloride from the same solution.

4. A process for the manufacture of a fertilizer which comprises treating a mineral containing both potassium chloride and sodium chloride with carbon dioxide, ammonia and water to form sodium bicarbonate and ammonium chloride and collecting the potassium chloride and the ammonium chloride.

5. A process for the manufacture of a fertilizer which comprises treating a solution containing both potassium chloride and sodium chloride with carbon dioxide and ammonia to form sodium bicarbonate and ammonium chloride.

6. A process for the manufacture of a fertilizer which comprises treating a solution of sylvinite with carbon dioxide and ammonia to form sodium bicarbonate and ammonium chloride.

7. A process for the manufacture of a fertilizer which comprises adding to the liquor which contains sodium bicarbonate, a mineral in the solid state containing both potassium chloride and sodium chloride, ammonia and carbon dioxide, cooling the solution to eliminate the ammonium chloride and the potassium chloride by precipitation, treating the remaining liquor with carbon dioxide to precipitate sodium bicarbonate and returning the remaining liquor to the process.

8. A process for the manufacture of a fertilizer which comprises adding to the liquor which contains sodium bicarbonate, sylvinite in the solid state, ammonia and carbon dioxide, cooling the solution to eliminate the ammonium chloride and the potassium chloride by precipitation, treating the remaining liquor with carbon dioxide to precipitate sodium bicarbonate and returning the remaining liquor to the process.

9. A process for the utilization of a mineral containing both potassium chloride and sodium chloride which consists in converting its sodium chloride into ammonium chloride by subjecting it to the action of carbon dioxide, ammonia and water while leaving its potassium chloride substantially unchanged.

10. A process for the utilization of sylvinite which consists in converting its sodium chloride into ammonium chloride by subjecting it to the action of carbon dioxide, ammonia and water while leaving its potassium chloride substantially unchanged.

11. A new solid product utilizable as a fertilizer which is obtained by treating a substance containing both potassium chloride and sodium chloride with carbon dioxide and ammonia to form sodium bicarbonate and separating this bicarbonate.

12. A new solid product utilizable as a fertilizer which is a mixture consisting substantially of potassium chloride and ammonium chloride, the latter having been formed by the conversion of the sodium chloride of a mineral containing both potassium chloride and sodium chloride.

13. A new solid product utilizable as a fertilizer which is a mixture consisting substantially of potassium chloride and ammonium chloride, both having been simultaneously obtained in a solid state from a solution of a mineral containing both potassium chloride and sodium chloride treated with carbon dioxide and ammonia and after the separation of the sodium bicarbonate formed.

In testimony whereof I, GEORGES CLAUDE, have signed this specification.

GEORGES CLAUDE.